(12) United States Patent
Lutti

(10) Patent No.: US 10,501,379 B2
(45) Date of Patent: Dec. 10, 2019

(54) METHOD OF PRODUCTION OF EDGE PROTECTION STRIPS OF CERAMIC MATERIAL

(71) Applicant: NUOVA CERAMICA CASA S.P.A., Fiorano Modenese (MO) (IT)

(72) Inventor: Giuseppe Lutti, Maranello (IT)

(73) Assignee: NUOVA CERAMICA CASA S.P.A., Fiorano Modenese (MO) (IT)

( * ) Notice: Subject to any disclaimer, the term of this patent is extended or adjusted under 35 U.S.C. 154(b) by 177 days.

(21) Appl. No.: 15/710,494

(22) Filed: Sep. 20, 2017

(65) Prior Publication Data
US 2018/0237349 A1 Aug. 23, 2018

(30) Foreign Application Priority Data

Feb. 21, 2017 (IT) .......................... 102017000019300

(51) Int. Cl.
| | |
|---|---|
| *B26D 3/06* | (2006.01) |
| *C04B 41/45* | (2006.01) |
| *C04B 35/71* | (2006.01) |
| *C04B 41/53* | (2006.01) |
| *C04B 111/00* | (2006.01) |

(52) U.S. Cl.
CPC .......... *C04B 41/4576* (2013.01); *B26D 3/065* (2013.01); *C04B 35/71* (2013.01); *C04B 41/53* (2013.01); *C04B 2111/00672* (2013.01); *E04B 2103/02* (2013.01)

(58) Field of Classification Search
CPC ....... C04B 41/4576; B28D 1/04; E04F 41/53; E04F 35/71; E04F 2111/00672; E04F 2103/02; E04F 2019/0418
USPC ....... 451/41, 58; 125/12, 13.01; 83/877, 878
See application file for complete search history.

(56) References Cited

U.S. PATENT DOCUMENTS

| | | | | |
|---|---|---|---|---|
| 1,967,262 | A | * | 7/1934 | Robinson ............... B26D 3/065 83/432 |
| 2,335,767 | A | * | 11/1943 | Kinports ................. B26D 3/02 425/304 |
| 2,511,962 | A | * | 6/1950 | Barnes ................... B28D 1/048 125/13.01 |
| 2,691,858 | A | * | 10/1954 | Jules ....................... B24D 5/12 125/13.01 |

(Continued)

FOREIGN PATENT DOCUMENTS

| | | |
|---|---|---|
| DE | 19815371 A1 | 10/1999 |
| EP | 1252957 A1 | 10/2002 |

*Primary Examiner* — George B Nguyen
(74) *Attorney, Agent, or Firm* — Volpe and Koenig, P.C.

(57) ABSTRACT

A method of production of edge protection strips (10) of ceramic material, includes the steps of: arranging a sheet-like article (20) of ceramic material elongated along a longitudinal axis (A) and provided with an exposed surface (S); incising the exposed surface (S) along two distinct incision planes, parallel to each other, orthogonal to the exposed surface (S) and each intersecting the exposed surface (S) along an incision line (I) parallel to the longitudinal axis (A); cutting the article (20) along two cutting planes each intersecting an incision plane along a cutting line (C) parallel to the incision lines (I) and mutually incident in an intersection line (X) included in the thickness of the article (20); and separating a substantially prismatic edge protection strip (10) from the article (20) with a first portion (S1) of exposed surface (S) internal to the incision lines (I).

10 Claims, 3 Drawing Sheets

(56) References Cited

U.S. PATENT DOCUMENTS

| | | | | |
|---|---|---|---|---|
| 2,911,773 A * | 11/1959 | Gobat | B28D 5/022 125/13.01 |
| 4,177,789 A * | 12/1979 | Marocco | B23Q 3/08 125/1 |
| 4,372,174 A * | 2/1983 | Cymbalisty | B23D 45/02 73/863.11 |
| 4,969,380 A * | 11/1990 | Halligan | B23D 45/146 144/134.1 |
| 5,016,800 A * | 5/1991 | Sato | B28D 5/0011 225/103 |
| 5,482,026 A * | 1/1996 | Russell | B23D 47/02 125/12 |
| 6,577,804 B2 * | 6/2003 | Murakami | G02B 6/25 225/96 |
| 8,425,279 B2 * | 4/2013 | Gurley | B28D 5/024 125/13.01 |
| 2001/0007254 A1 * | 7/2001 | Akram | B28D 5/024 125/13.01 |
| 2006/0042437 A1 * | 3/2006 | Gerrard | B23Q 11/0003 83/39 |
| 2013/0175242 A1 * | 7/2013 | Lancaster-Larocque | H01F 41/0253 219/69.12 |
| 2013/0271863 A1 * | 10/2013 | Shimanuki | B26D 1/015 359/838 |
| 2014/0238374 A1 * | 8/2014 | Kahkonen | B28D 7/02 125/13.01 |

\* cited by examiner

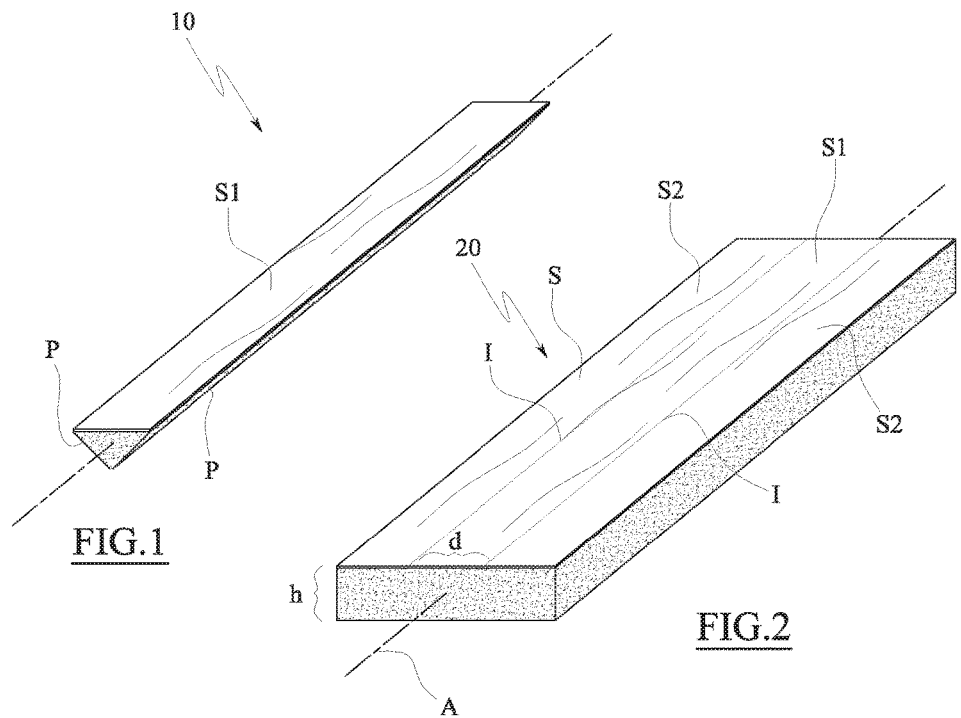
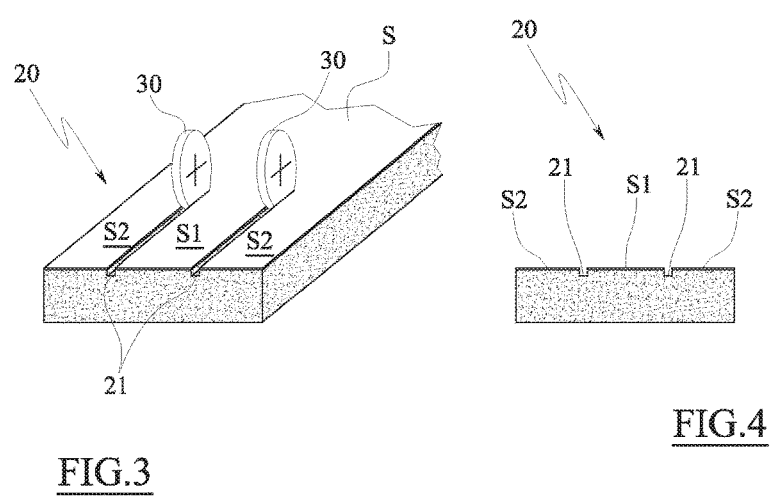
FIG.3
FIG.4

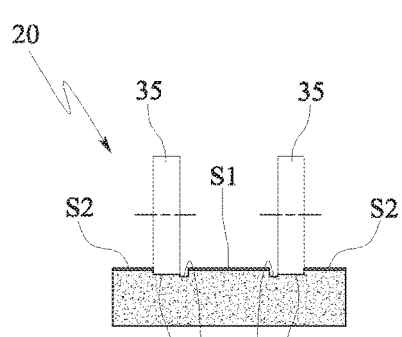
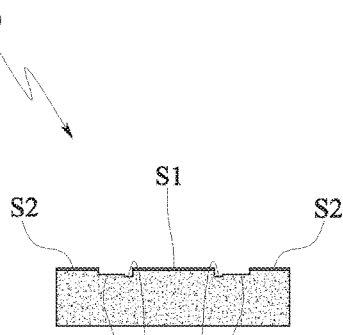
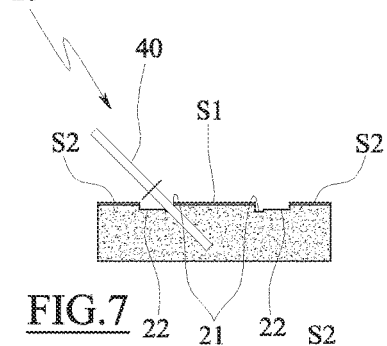
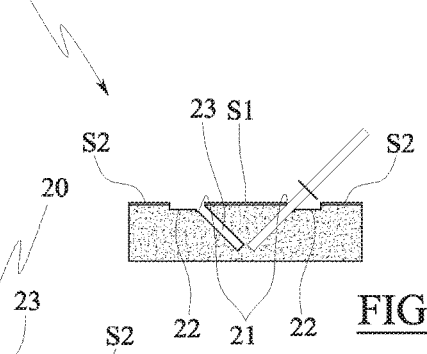
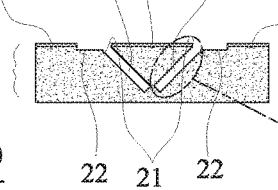
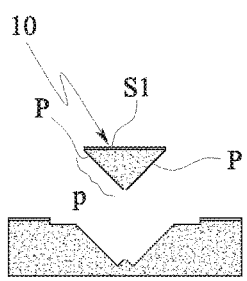
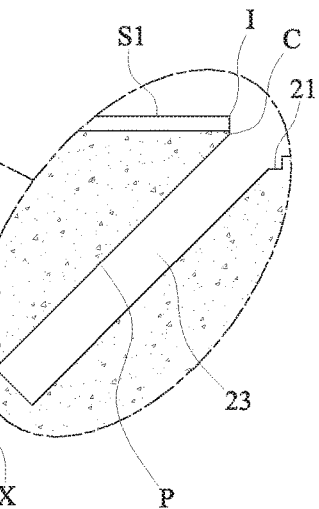

METHOD OF PRODUCTION OF EDGE PROTECTION STRIPS OF CERAMIC MATERIAL

TECHNICAL FIELD

The present invention relates to a method of production of edge protection strips of ceramic material, for example of edge protection strips provided with a surface finishing equal to the finishing of the tiles associated with them.

BACKGROUND

As is known in the building sector, in certain joining points between various levels of surfaces covered with tiles or similar sheet-like elements, the use is known of edge protection strips, that is shaped strips of metal, of plastic material or of ceramic material which cover the joining line, for example at inner or outer corners, between side-by-side tiles.

The edge protection strips of ceramic material generally have an exposed surface which is as close as possible or resembles the exposed surface of the tiles they join so as to decrease as much as possible the difference also in color between the discontinuous surfaces joined by the edge protection strip itself.

A need which is felt in the sector is therefore the one of making the exposed surfaces of the strips resemble as much as possible the exposed surfaces of the tiles they join.

Moreover, a further need in the sector is the one of making available a method of production of edge protection strips which is as affordable, quick and accurate as possible.

It is an object of the present invention to meet the mentioned needs of the known technique, within the scope of a simple, rational and affordable solution.

Such objects are achieved by the features of the invention indicated in the independent claim. The dependent claims outline preferred and/or particularly advantageous aspects of the invention.

SUMMARY

The invention particularly makes available a method of production of edge protection strips of ceramic material, comprising the steps of:
  arranging a sheet-like article of ceramic material, in which the sheet-like article is elongated along a longitudinal axis and is provided with an exposed surface;
  incising the exposed surface of the sheet-like article along two distinct incision planes, parallel to each other, orthogonal to the exposed surface and each intersecting the exposed surface of the sheet-like article along an incision line parallel to the longitudinal axis of the sheet-like article;
  cutting the sheet-like article along two cutting planes each intersecting an incision plane along a cutting line parallel to the incision lines and mutually incident in an intersection line comprised in the thickness of the sheet-like article; and
  separating a substantially prismatic edge protection strip from the sheet-like article, in which the edge protection strip comprises a portion of exposed surface internal to the incision lines.

Due to such solution, an edge protection strip with a functional shape may be made, and having the surface finishing (exposed surface) homologous to the one of sheets it will complete in place.

Advantageously, each cutting plane may be inclined by 45° with respect to the exposed surface.

Due to such solution, the cutting planes are perpendicular to one another and allow the definition of laying surfaces of the edge protection strip which are convenient and functional for the use thereof.

The method for example, comprises the step of determining the distance between the incision lines as a function of a thickness of the sheet-like article.

In greater detail, the distance between the cutting lines may be calculated with the present formula:

$$d = k * h * \sqrt{2}$$

where d is the distance between the cutting lines, k is a correction factor of between 0 and 1 and h is the thickness of the sheet-like article.

Due to such solution, the width of the portion of exposed surface which is isolated in the edge protection strip is such as to be capable of completely joining two exposed surfaces of ceramic sheets or other perpendicular elements or parallel elements.

Advantageously, the incision depth along each incision plane may be of between 1.5 mm and 3 mm.

The method may comprise moreover the step of determining the cutting depth along each cutting plane as a function of a thickness of the sheet-like article.

In greater detail for example, the cutting depth along each cutting plane is calculated with the present formula:

$$p = y * h$$

where p is the cutting depth along each cutting plane, y is a correction factor of between 0 and 1 and h is the thickness of the sheet-like article.

In particular, it may be provided for the cuts to intersect one another so as to separate immediately the edge protection strip from the remaining part of the sheet-like article, or advantageously provide for the cuts not to intersect with one another and leave the edge protection strip still attached, by means of a bridge, to the remaining part of the sheet-like article, thus allowing in this case the detachment to occur at a later time, thus avoiding accidental breaks of the edge protection strip being made.

In a preferred embodiment, before the cutting step the method may comprise the step of removing a cortical layer comprising a further portion of exposed surface external with respect to the incision lines.

Due to such solution, the cutting step may occur in a more convenient manner and with less risks of accidental breaking of the edge protection strip being made.

Advantageously, the removal depth may be substantially equal to 1 mm.

For example, the separation step of the edge protection strip of the remaining part of the sheet-like article is carried out by the propagation of a brittle fracture along a fracture line substantially coincident or proximal with the intersection line of the cutting planes.

Due to such solution, the edge protection strip is divided by the remaining part of the sheet-like article in a convenient and safe manner with increased efficiency in terms of reducing the rejects and defects thereof.

BRIEF DESCRIPTION OF THE DRAWINGS

Further features and advantages of the invention will be more apparent after reading the following description provided by way of a non-limiting example, with the aid of the accompanying drawings.

FIG. 1 is a schematic axonometric view of an edge protection strip obtained with the method according to the invention.

FIG. 2 is a schematic axonometric view of a sheet-like article from which the edge protection strip in FIG. 1 is obtained by means of cutting.

FIG. 3 is a schematic axonometric view of a first incision step of the production method of an edge protection strip according to the invention.

FIG. 4 is a front schematic view of a semi-finished sheet-like article at the end of the first incision step of the method.

FIG. 5 is a front schematic view of a second removal step of the production method of an edge protection strip according to the invention.

FIG. 6 is a front schematic view of a semi-finished sheet-like article at the end of the second removal step of the method.

FIG. 7 and FIG. 8 are front schematic views of a third cutting step of the production method of an edge protection strip according to the invention.

FIG. 9 is a front schematic view of a semi-finished sheet-like article at the end of the third cutting step of the method.

FIG. 10 is a front schematic view of a semi-finished sheet-like article at the end of the fourth separation step of the method, and of an edge protection strip obtained following the fourth separation step.

DETAILED DESCRIPTION OF THE PREFERRED EMBODIMENTS

Figure 11A:
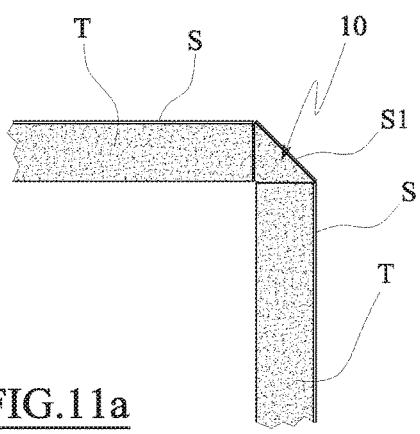
FIGS. 11a-11f are schematic views of possible laying configurations of the edge protection strip in FIG. 1.

With particular reference to such drawings, a method is described for the production of edge protection strips, generically indicated with number 10 in the drawings, which is made of ceramic material (or the like), for example glazed material.

For example, the method of production is a method of production which provides cutting an edge protection strip 10 starting from a sheet-like article indicated generically with number 20 in the drawings, for example a ceramic sheet (or tile) or a portion thereof, for example having large dimensions.

In the example, the sheet-like article 20 is obtained by means of the longitudinal pre-cutting of a longitudinal strip of ceramic material (or the like) from a sheet having larger dimensions, for example having a length equal to the length of the longitudinal strip and width larger than it.

For example therefore, the sheet-like article 20 has an elongated (and flat) shape provided with a substantially straight longitudinal axis A.

The sheet-like article 20 is a solid body (of glazed material) which substantially has the shape of a parallelepiped provided with an (ample) laying surface (not exposed) and an opposed (ample) substantially planar exposed surface S.

The sheet-like article 20 has a thickness h (or height) defined by the distance between the exposed surface S and the opposed laying surface.

The length of the sheet-like article 20 is (normally) much greater than the width thereof and the width in turn is much greater than the thickness.

For example, the thickness h is substantially greater than 0.8 cm, for example of between 0.8 cm and 3 cm.

The width of the sheet-like article 20, for example obtained from the aforesaid longitudinal pre-cutting, is substantially greater than 1.5 cm, for example of between 2 and 4 cm.

The length of the sheet-like article 20 is for example, equal to the length of the ceramic sheet from which it originates.

The exposed surface S of the sheet-like article 20 is for example, decorated or finished by a layer, at least a surface layer (or the whole mass) of a decoration, for example obtained by means of digital printing or glazing, as is known to an expert in the field.

The decoration (and/or the exposed surface S) may be planar or structured according to the sheet-like article 20.

In practice, the decoration of the exposed surface S of the sheet-like article 20 is a portion (or partition) of the decoration of the ceramic sheet from which the sheet-like article itself originates and therefore is completely homologous and conforms with the decoration of the ceramic sheets of the lot of ceramic sheets from which the sheet-like article 20 originates.

The method for producing (and obtaining) an edge protection strip 10 starting from a sheet-like article 20 as described above, is the following.

The method provides firstly incising the exposed surface S of the sheet-like article 20 along two distinct incision planes, parallel to each other, orthogonal to the exposed surface S and each intersecting the exposed surface S of the sheet-like article 20 along an incision line S (shown with a dotted line in FIG. 2) parallel to the longitudinal axis A of the sheet-like article 20.

In practice, by means of the incision step, the exposed surface S is subdivided into a first portion S1 of internal exposed surface S between the two incision lines I (comprised therebetween along the direction orthogonal to the longitudinal axis A) and two opposed second portions S2 of exposed (or peripheral) surfaces external with respect to the incision lines I.

The width of the first portion S1 is defined by the (minimum) distance d between the incision lines I.

The method provides, in particular, determining the distance between the incision lines I as a function of the thickness h of the starting sheet-like article 20 (that is the thickness of the sheet(s) from which the sheet-like article 20 originates and which the edge protection strip being produced is intended to complete in place).

In greater detail, the distance between the incision lines I is calculated with the present formula:

$$d=k*h*\sqrt{2}$$

where d is the distance between the incision lines, k is a correction factor of between 0 and 1, preferably of between 0.8 and 1, and h is the thickness of the sheet-like article 20.

For example, the incision depth along each incision plane is limited, for example is such as to cut the whole decoration (that is, extends for a thickness at least equal to the thickness of the decoration on the exposed surface S) and possibly slightly beyond, for example not beyond half of the thickness of the sheet-like article 20.

For example, the incision depth along each incision plane is of between 1.5 mm and 3 mm.

The incision step for example is performed, as shown in FIG. 3, by a pair of first rotating cutting grindstones 30, for example diamond cutting grindstones.

The pair of first cutting grindstones 30 is for example coaxial and/or parallel.

Alternatively, the pair of first cutting grindstones 30 may be offset from each other, that is not have axes of rotation coaxial to each other, in such case the cutting profile of each first cutting grindstone 30 is for example, conical and defines an incision plane as described above (and an opposed incision plane inclined with respect thereto).

The first cutting grindstones 30 have a reduced thickness, for example of between 1.5 and 2.5 mm.

The distance between the first cutting grindstones 30, that is the distance between the surfaces reciprocally facing the same, may be adjusted as a function of the wanted distance d between the cutting lines I.

In practice, during the incision step, the sheet-like article 20 is advanced on a transport plane (for example, a roller plane) along a feed direction (horizontal and) orthogonal to the axis of rotation of the first cutting grindstones 30 with longitudinal axis A parallel to such feed direction.

At the end of the incision step, the sheet-like article 20 has two incisions 21 (of the aforesaid depth and spaced apart by the aforesaid distance d) at the exposed surface S, which separate the first portion S1 and the two second portions S2.

The incisions 21 are for the entire extension, that is they have a length equal to the length of the sheet-like article 20.

In practice, a side of each incision 21 delimits a side of the first portion S1 of the exposed surface S.

The said side has a controlled planarity, for example according to restricted tolerances, so as to ensure an increased linearity of the incision line I and therefore an increased regularity of the outer edge of the first portion S1 of the exposed surface S.

The method provides optionally removing a cortical layer from the sheet-like article 20, in which the cortical layer comprises at least a part of the second portion S2 of exposed surface S external with respect to the incision lines I.

In particular, the method provides removing a cortical layer for each second portion S2.

For example, the cortical layer to be removed is adjacent to the respective incision 21 and the removal of the cortical layer itself widens the upper portion of the incision 21 towards the outside of the sheet-like article 20 by a determined width equal to the width of the cortical layer itself.

For example, the width of the cortical layer to be removed is substantially of between 1.5 mm and 4.6 mm.

For example, the width of the cortical layer to be removed is less than the overall width of the second portion S2.

Preferably, the removal depth of each cortical layer is of between 0.8 mm and 1.2 mm, preferably equal to 1 mm.

The removal step of the aforesaid cortical layers for example is performed, as shown in FIG. 5, by a pair of second rotating cutting grindstones 35, for example diamond cutting grindstones.

The pair of second cutting grindstones 35 is for example, coaxial.

Each second cutting grindstone 35 for example, consists of a plurality of sandwiched grindstones.

The second cutting grindstones 35 have a thickness, for example of between 1.5 and 4.6 mm.

The distance between the second cutting grindstones 35, that is the distance between the surfaces reciprocally facing the same, may be adjusted as a function of the distance d between the cutting lines I and the width of the incision 21, in practice the distance between the second cutting grindstones 35 is equal to the distance d between the incision lines I and 2 times the width of the incision 21.

In practice, during the removal step, the sheet-like article 20 is advanced on a transport plane (for example, a roller plane) along a feed direction (horizontal and) orthogonal to the axis of rotation of the second cutting grindstones 35 with longitudinal axis A parallel to such feed direction.

At the end of the removal step, the sheet-like article 20 has two channels 22 (of the aforesaid depth and spaced apart by the aforesaid distance), each at a respective second portion S2 of the exposed surface S.

Each channel 22 widens towards the outside of the sheet-like article 20 (along a direction orthogonal to the longitudinal axis A), that is in direction opposite with respect to the first portion S1, a top portion of a respective incision 21.

The channels 22 are for the entire extension, that is they have a length equal to the length of the sheet-like article 20 and of the respective incisions 21.

The method provides then cutting the sheet-like article 20 along the two cutting planes, in each cutting plane there is a plane which intersects a respective incision plane along a cutting line C (see enlarged detail in FIG. 9) parallel to the respective incision line I.

For example, each cutting line C (substantially straight) is parallel to the incision line I and lies on a respective incision plane.

In practice, each cutting line C may coincide with the respective incision line I or preferably, be distinct therefrom.

Each incision line I is substantially (permanently) overlapping a respective cutting line C.

The cutting planes are then inclined to one another (each of them is inclined) with respect to the incision planes.

In particular, the cutting planes are incident with one another (ideally) on an intersection line X, which is parallel to the cutting lines C and to the incision lines I (that is parallel to the longitudinal axis A of the sheet-like article A) and is comprised in the thickness of the sheet-like article 20, that is internal to the volume of the body of the sheet-like article itself.

In practice, the cutting planes are such as to define a convex portion defined internally therein and comprising the first surface S1, which convex portion has a cross-section (with respect to any plane orthogonal to the longitudinal axis A of the sheet-like article 20) of substantially triangular or pentagonal shape, with the largest base defined at the first portion S1 of the exposed surface S and opposite vertex facing towards the inside of the body of the sheet-like article 20, that is facing towards the laying surface of the sheet-like article itself.

Such convex portion is the one which will constitute the edge protection strip 10, as will be described better below.

The convex portion stands out after the cutting from a concave portion of the sheet-like article 20 which, for example, becomes a reject portion thereof at the end of the method.

In the example, the cross-section of the convex portion is substantially pentagonal and consists of the aforesaid largest base, two short sides opposed with respect to the largest base perpendicular therewith, defined at each incision plane (line which joins the incision line I with the cutting line C), and two long sides opposed with respect to the largest base incident in the (ideal) vertex defined by the intersection line X and defined at each cutting plane (line which joins the cutting line with the intersection line).

For example, each cutting plane is inclined by 45° with respect to the exposed surface.

Advantageously, each cutting plane is inclined with respect to the other cutting plane by an angle which is substantially a right angle.

In practice, the angle to the (inner) vertex of the convex portion is substantially a right angle.

The method comprises the step of determining the cutting depth along each cutting plane as a function of a thickness h of the sheet-like article 20.

For example, it is possible to determine the cutting depth along each cutting plane so that the convex portion remains joined (at least initially) at the vertex line of the concave portion of the sheet-like article 20 (see FIG. 9) by means of a bridge of ceramic material which axially joins the concave portion and the convex portion.

In practice, the cutting depth may be determined along each cutting plane so that the cut along each cutting plane does not reach the intersection line X between the cutting planes.

For example, the cutting depth along each cutting plane may be calculated with the present formula:

$$p=y*h$$

where p is the cutting depth along each cutting plane, y is a correction factor of between 0 and 1, preferably of between 0.8 and 1, and h is the thickness of the sheet-like article 20.

For example, the correction factor y may be equal to (or different from) the correction factor k.

The cutting step for example is performed, as shown in FIGS. 7 and 8, by a pair of third rotating cutting grindstones 40, for example diamond cutting grindstones.

The pair of third cutting grindstones 40 is for example offset, that is has axes of rotation which are inclined from one another (for example, by 45° with respect to the exposed surface S).

The third cutting grindstones 40 have a reduced thickness, for example of between 1.5 and 2.5 mm.

The reciprocally facing surfaces of the third cutting grindstones 40 are flat and each define a respective cutting plane.

In practice, the position of the third cutting grindstones 40 is defined as a function of the cutting line C wanted, of the orientation of the cutting plane wanted and of the cutting depth determined.

In practice, during the cutting step, the sheet-like article 20 is advanced on a transport plane (for example, a roller plane) along a feed direction (horizontal and) with longitudinal axis A parallel to such feed direction.

For example, the third cutting grindstones 40 are offset along the longitudinal axis A of the sheet-like article 20, that is they intersect different axial portions of the sheet-like article 20 during the feeding thereof along the feed direction.

At the end of the cutting step (see FIG. 9), the sheet-like article 20 has two cuts 23 (of the aforesaid depth and separated by the bridge of ceramic material) which extend the respective incisions 21 towards the laying surface of the sheet-like article 20 and towards the intersection line X.

The cuts 23 are for the entire extension, that is they have a length equal to the length of the sheet-like article 20.

In practice, an (inner) side of each cut 23 delimits a side of the concave portion.

The said side has a controlled planarity, for example according to restricted tolerances, so as to ensure an increased linearity of the long sides of the concave portion which defines a surface of the edge protection strip 10.

The bridge which joins the convex portion and the concave portion of the sheet-like article 20 has a substantially "hour-glass" cross-section, that is provided with a reduction (for the entire extension), for example at the intersection between the bottom of each cut and the respective cutting plane.

The shape of the bridge is dependent on the thickness and profile of the third cutting grindstones 40.

At this point, the method provides the step of separating the edge protection strip 10, that is the prismatic convex portion which includes the whole first portion S1 of the exposed surface S, from the remaining part of the sheet-like article 20, that is from the concave portion.

The separation step is carried out by the propagation of a brittle fracture along a predefined fracture line substantially coincident (or comprising or proximal to) with the intersection line X of the cutting planes.

In practice, the bridge, that is the reduction thereof, defines a preferential fracture zone in the body of the sheet-like article 20 which allows the permanent separation of the convex portion defining the aforesaid edge protection strip 10, from the remaining concave portion.

In practice, the reduction defines a preferential trigger zone of the brittle fracture which, when stressed (with reduced effort), defines a longitudinal fracture along the whole vertex of the convex portion which allows obtaining the edge protection strip 10.

The edge protection strip 10 thus obtained (following the separation) is a part of the sheet-like article 20 comprising the first portion S1 of exposed surface S thereof and shaped like a prism having substantially triangular- or pentagonal-shaped bases (of the aforesaid shape for the cross-section of the convex portion).

In practice, the edge protection strip 10 comprises a largest face entirely made from the first portion S1 of the exposed surface S (corresponding to the largest base of the cross-section), a vertex corner opposed to the largest face which is joined to the largest base by means of at least two main faces P (see FIG. 1 and FIG. 10) which are perpendicular to each other which (coincide with the cutting planes and) each define a respect laying surface of the edge protection strip 10 (in which the main faces P correspond to the long sides of the cross-section of the convex portion).

The edge protection strip 10 may be laid as known by the expert in the field (together with one or more ceramic sheets T homologous to those ceramic sheets which gave rise to the sheet-like article 20 and therefore, to the relative edge protection strip 10) for example, by means of glue and resting on one or both the laying surfaces thereof so that the first portion S1 of the exposed surface S remains exposed and joins with an exposed surface of one or more ceramic sheets T, sheet-like articles 20 or other known covering elements.

FIGS. 11*a*-11*f* show some example of possible laying layouts for laying an edge protection strip 10 as made above.

The edge protection strip 10 in FIG. 11*a* covers an outer corner between two ceramic sheets T (or sheet-like articles 20) perpendicular to each other; they may be the riser and tread of a step, a corner between two perpendicular surfaces, an upper wall cover or the like.

Figure 11B:
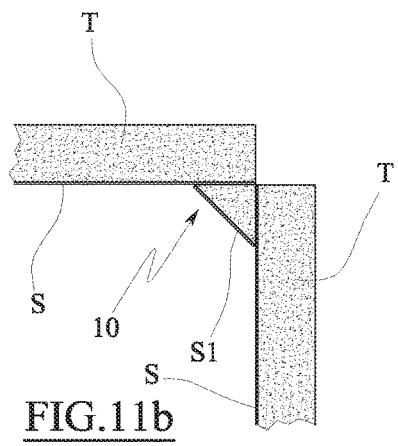

The edge protection strip 10 in FIG. 11*b* covers an inner corner between two ceramic sheets T (or sheet-like articles 20) perpendicular to each other.

Figure 11C:
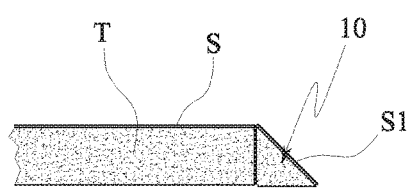
Figure 11D:
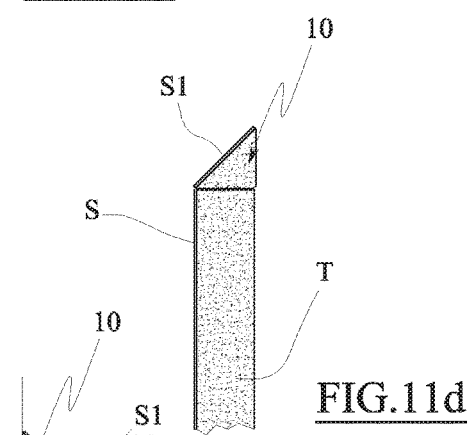

The edge protection strip 10 in FIGS. 11*c* and 11*d* defines a closing element respectively of a horizontal surface covered by ceramic sheets T, for example which may be tread on, such as a floor, and a vertical surface covered by ceramic sheets T, for example a wall cover.

Figure 11E:
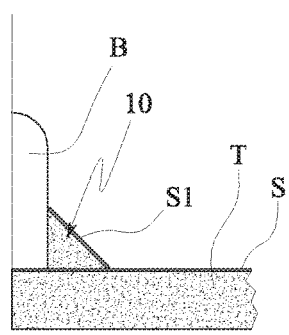
Figure 11F:
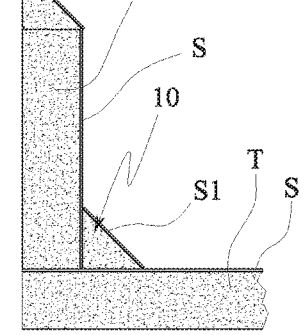

The edge protection strip 10 in FIGS. 11*e* and 11*f* define a finishing element of a skirting board B (defined by a sheet-like article 20 or by another longitudinal element), for example by covering the inner corner between the skirting board B and the ceramic sheet T for covering the floor and/or defining a closing element of a vertical surface defined by the skirting board itself.

The invention thus conceived is susceptible to several modifications and variations, all falling within the scope of the inventive concept.

Moreover, all the details can be replaced by other technically equivalent elements.

Practically, any materials and also any contingent shapes and sizes may be used, depending on the needs, without departing from the scope of protection of the following claims.

The invention claimed is:

1. A method of production of edge protection strips of ceramic material, comprising the steps of:
    arranging a tile of ceramic material, wherein the tile is elongated along a longitudinal axis and is provided with an exposed surface;
    incising the exposed surface of the tile along two distinct incision planes, parallel to each other and orthogonal to the exposed surface, wherein each of the two distinct incision planes intersect the exposed surface of the tile along a respective incision line parallel to the longitudinal axis of the tile;
    cutting the tile along two cutting planes each intersecting an incision plane along a cutting line parallel to the incision lines, wherein the two cutting planes intersect in an intersection line comprised in the thickness of the tile; and
    separating a generally prismatic edge protection strip from the tile, wherein the edge protection strip comprises a first portion of exposed surface internal to the incision lines.

2. The method according to claim 1, wherein each cutting plane is inclined by 45° with respect to the exposed surface.

3. The method according to claim 1, further comprising the step of determining the distance between the incision lines as a function of a thickness of the tile.

4. The method according to claim 1, wherein a distance between the cutting lines is calculated by the present formula:

$$d=k*h*\sqrt{2}$$

where d is the distance between the cutting lines, k is a correction factor of between 0 and 1 and h is the thickness of the tile.

5. The method according to claim 1, wherein an incision depth along each incision plane is comprised between 1.5 mm and 3 mm.

6. The method according to claim 1, further comprising the step of determining a cutting depth along each cutting plane as a function of a thickness of the tile.

7. The method according to claim 6, wherein the cutting depth along each cutting plane is calculated by the present formula:

$$p=y*h$$

wherein p is the cutting depth along each cutting plane, y is a correction factor of between 0 and 1 and h is the thickness of the tile.

8. The method according to claim 1, further comprising the step of removing a cortical layer comprising a second portion of exposed surface external with respect to the incision lines.

9. The method according to claim 8, wherein a removal depth is generally equal to 1 mm.

10. The method according to claim 1, wherein the step of separating is carried out by the propagation of a brittle fracture along a fracture line generally coincident with the intersection line of the cutting planes.

* * * * *